United States Patent
Yan (10) Patent No.: US 10,693,657 B2
(45) Date of Patent: Jun. 23, 2020

(54) METHOD AND APPARATUS FOR VERIFYING PROCESSED DATA

(71) Applicant: Nokia Technologies Oy, Espoo (FI)

(72) Inventor: Zheng Yan, Xian (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/122,477

(22) PCT Filed: Mar. 7, 2014

(86) PCT No.: PCT/CN2014/073050
§ 371 (c)(1),
(2) Date: Aug. 30, 2016

(87) PCT Pub. No.: WO2015/131394
PCT Pub. Date: Sep. 11, 2015

(65) Prior Publication Data
US 2017/0070351 A1    Mar. 9, 2017

(51) Int. Cl.
*H04L 9/32*   (2006.01)
*G06F 21/44*  (2013.01)
(Continued)

(52) U.S. Cl.
CPC ............ *H04L 9/3247* (2013.01); *G06F 21/44* (2013.01); *G06F 21/57* (2013.01);
(Continued)

(58) Field of Classification Search
None
See application file for complete search history.

(56) References Cited

U.S. PATENT DOCUMENTS

| 8,117,325 B1* | 2/2012 | Wu ..................... H04L 63/0281 709/229 |
| 8,417,715 B1* | 4/2013 | Bruckhaus ............. G06Q 10/04 707/758 |

(Continued)

FOREIGN PATENT DOCUMENTS

| CN | 101432749 A | 5/2009 |
| CN | 102066678   | 5/2011 |

(Continued)

OTHER PUBLICATIONS

International Search Report and Written Opinion received for corresponding Patent Cooperation Treaty Application No. PCT/CN2014/073050, dated Dec. 8, 2014, 15 pages.

(Continued)

*Primary Examiner* — Farid Homayounmehr
*Assistant Examiner* — Olanrewaju J. Bucknor
(74) *Attorney, Agent, or Firm* — Laine IP Oy (57) ABSTRACT

A method, comprising: obtaining, at a trustworthy party, a data processing result from a requesting party or a processing party in response to receiving a request for verifying correctness of the data processing result from the requesting party, wherein the data processing result is obtained by the requesting party from the processing party; obtaining, at a trustworthy party, the data used to getting the data processing result and a corresponding algorithm from the processing party, wherein the processing party uses the corresponding algorithm to process the data and gets the data processing result; processing, at the trustworthy party, the obtained data with the corresponding algorithm and comparing the processed result with the received data processing result, and if the two results are the same, the data processing result verified by the trustworthy party is correct.

17 Claims, 7 Drawing Sheets

(51) Int. Cl.
*G06F 21/62* (2013.01)
*G06F 21/57* (2013.01)
*H04W 4/70* (2018.01)
*H04L 9/00* (2006.01)
*H04L 9/06* (2006.01)
*H04L 9/14* (2006.01)
*H04L 9/30* (2006.01)
*H04L 29/06* (2006.01)

(52) U.S. Cl.
CPC .......... *G06F 21/6245* (2013.01); *H04L 9/008* (2013.01); *H04L 9/0643* (2013.01); *H04L 9/14* (2013.01); *H04L 9/30* (2013.01); *H04L 63/123* (2013.01); *H04W 4/70* (2018.02)

(56) References Cited

U.S. PATENT DOCUMENTS

| | | | | |
|---|---|---|---|---|
| 8,468,345 | B2* | 6/2013 | Auradkar | G06F 21/602 713/167 |
| 9,058,141 | B2* | 6/2015 | Grosz | G06F 3/1242 |
| 9,300,649 | B2* | 3/2016 | Dickinson | H04L 63/08 |
| 9,380,037 | B2* | 6/2016 | Parann-Nissany | H04L 63/06 |
| 10,116,445 | B2* | 10/2018 | Veugen | G06F 21/6245 |
| 2009/0131109 | A1 | 5/2009 | Cofta | |
| 2010/0100465 | A1* | 4/2010 | Cooke | G06Q 30/04 705/34 |
| 2010/0246812 | A1* | 9/2010 | Rane | H04L 9/302 380/28 |
| 2011/0119481 | A1* | 5/2011 | Auradkar | G06F 21/6209 713/150 |
| 2011/0145580 | A1* | 6/2011 | Auradkar | H04L 63/0428 713/170 |
| 2011/0264920 | A1 | 10/2011 | Rieffel et al. | |
| 2012/0002811 | A1* | 1/2012 | Smart | H04L 9/085 380/255 |
| 2012/0297198 | A1 | 11/2012 | Danezis et al. | |
| 2012/0324228 | A1 | 12/2012 | Padhye et al. | |
| 2013/0247230 | A1* | 9/2013 | Parann-Nissany | H04L 63/06 726/30 |
| 2013/0254539 | A1* | 9/2013 | Auradkar | G06F 21/6209 713/165 |
| 2014/0019764 | A1 | 1/2014 | Gopal et al. | |
| 2014/0195797 | A1* | 7/2014 | du Toit | H04L 63/168 713/152 |
| 2014/0195818 | A1* | 7/2014 | Neumann | G06F 21/6209 713/189 |
| 2015/0278810 | A1* | 10/2015 | Ramatchandirane | G06Q 20/30 705/16 |
| 2016/0020898 | A1* | 1/2016 | Nikolaenko | H04L 9/0816 713/168 |

FOREIGN PATENT DOCUMENTS

| | | |
|---|---|---|
| CN | 102202046 | 9/2011 |
| CN | 102438044 A | 5/2012 |
| CN | 102822836 | 12/2012 |
| CN | 103095847 A | 5/2013 |
| CN | 103108028 A | 5/2013 |
| CN | 103218754 | 7/2013 |
| CN | 103327044 A | 9/2013 |
| EP | 2159653 A1 | 3/2010 |
| WO | 2013/072925 A2 | 5/2013 |

OTHER PUBLICATIONS

Wang et al., "Enabling Public Auditability and Data Dynamics for Storage Security in Cloud Computing", IEEE Transactions on Parallel and Distributed Systems, vol. 22, No. 5, May 2011, pp. 847-859.

Wang et al. ,"Privacy-Preserving Public Auditing for Secure Cloud Storage", IEEE Transactions on Computers, vol. 52, No. 2, Feb. 2013, pp. 362-375.

Mishra et al., "Anonymity Enabled Secure Multi-Party Computation for Indian BPO", IEEE Region 10 Conference Tencon, Oct. 30-Nov. 2, 2007, 4 pages.

Liu et al., "A Protocol of Secure Multi-party Multi-Data Ranking and Its Application in Privacy Preserving Sequential Pattern Mining", Fourth International Joint Conference on Computational Sciences and Optimization, Apr. 15-19, 2011, pp. 272-275.

Zhu et al., "Three New Approaches to Privacy-Preserving Add to Multiply Protocol and Its Application", Second International Workshop on Knowledge Discovery and Data Mining, Jan. 23-25, 2009, pp. 554-558.

Wang et al., "Design and Analysis of Private-Preserving Dot Product Protocol", International Conference on Electronic computer Technology, Feb. 20-22, 2009, pp. 531-535.

Shen et al., "The Research of Privacy-Preserving Clustering Algorithm", Third International Symposium on Intelligent Information Technology and Security Informatics, Apr. 2-4, 2010, pp. 324-327.

Liu et al., "A Solution to Privacy-Preserving Two-Party Sign Test on Vertically Partitioned Data (P22NSTv) Using Data Disguising Techniques", International Conference on Networking and Information Technology, Jun. 11-12, 2010, pp. 526-534.

Zhan et al., "Privacy-Preserving Collaborative Association Rule Mining", Journal of Network and Computer Applications, vol. 30, No. 3, Aug. 2007, pp. 1216-1227.

Kantarcioglu et al., "Privacy-Preserving Distributed Mining of Association Rules on Horizontally Partitioned Data", IEEE Transactions on Knowledge and Data Engineering, vol. 16, No. 9, Sep. 2004, pp. 1026-1037.

Zhang et al., "A More Well-Founded Security Proof of the Privacy-Preserving Distributed Mining of Association Rules Protocols", Proceedings of the first international workshop on Model driven service engineering and data quality and security, Nov. 6, 2009, pp. 25-28.

Wang et al., "Research on Privacy Preserving Association Rule Mining a Survey", The 2nd IEEE International Conference on Information Management and Engineering (ICIME), Apr. 16-18, 2010.

Sanil et al., "Privacy Preserving Regression Modelling Via Distributed Computation", Proceedings of the tenth ACM SIGKDD international conference on Knowledge discovery and data mining, Aug. 22-25, 2004, pp. 677-682.

Liu et al., "Privacy Preserving Distributed DBSCAN Clustering", Proceedings of the 2012 Joint EDBT/ICDT AIorkshops, Mar. 30, 2012, pp. 177-185.

Ester et al., "A Density-Based Algorithm for Discovering Clusters in Large Spatial Databases With Noise", Proceedings of the Second International Conference on Knowledge Discovery and Data Mining, Aug. 2-4, 1996, pp. 226-231.

Wan et al., "Privacy-Preservation for Gradient Descent Methods", Proceedings of the 13th ACM SIGKDD international conference on Knowledge discovery and data mining, Aug. 12-15, 2007, pp. 775-783.

Amirbekyan et al., "Practical Protocol for Yao's Millionaires Problem Enables Secure Multi-Party Computation of Metrics and Efficient Privacy-Preserving k-NN for Large Data Sets", JournalKnowledge and Information Systems, vol. 21, No. 3, Nov. 2009, 29 pages.

Herrmann et al., "Secure Multi-Party Computation Problem for Distributed Electronic Contract Management", 2nd Information and Communication Technologies, Apr. 24-28, 2006, pp. 274-279.

Thoma et al., "Secure Multiparty Computation Based Privacy Preserving Smart Metering System", North American Power Symposium (NAPS), Sep. 9-11, 2012, 6 pages.

Jangde et al., "A Secure Multiparty Computation Solution to Healthcare Frauds and Abuses", Second International Conference on Intelligent Systems, Modelling and Simulation (ISMS), Jan. 25-27, 2011, pp. 139-142.

Krishnan et al., "Policy-Agile Encrypted Networks Via Secure Function Computation", Military Communications Conference (MILCOM), Oct. 31-Nov. 3, 2010, pp. 954-959.

Luo et al., "Privacy-Preserving Protocols for String Matching", 4th International Conference on Network and System Security (NSS), Sep. 1-3, 2010, pp. 481-485.

(56) References Cited

OTHER PUBLICATIONS

Erkin et al., "Generating Private Recommendations in a Social Trust Network", International Conference on Computational Aspects of Social Networks (CASoN), Oct. 19-21, 2011, pp. 82-87.

Li et al., "Privacy-Preserving Distributed Profile Matching in Proximity-Based Mobile Social Networks", IEEE Transactions on Wireless Communications, vol. 12, No. 5, May 2013, pp. 2024-2033.

Frikken et al., "Privacy-Preserving Credit Checking", Proceedings of the 6th ACM conference on Electronic commerce, Jun. 5-8, 2005, pp. 147-154.

Atallah et al., "Private Collaborative Forecasting and Benchmarking", Proceedings of the 2004 ACM workshop on Privacy in the electronic society, Oct. 28-28, 2004, pp. 103-114.

Wang et al., "Privacy-Preserving Genomic Computation Through Program Specialization", Proceedings of the 16th ACM conference on Computer and communications security, Nov. 9-13, 2009, pp. 338-347.

Huang et al., "Privacy-Preserving Path-Inclusion Protocol Through Oblivious Automata", IEEE International Conference on Intelligent Control, Automatic Detection and High-End Equipment, Jul. 27-29, 2012, pp. 128-132.

Kerschbaum et al., "Security Against the Business Partner", Proceedings of the 2008 ACM workshop on Secure web services, Oct. 31, 2008, pp. 1-10.

Pang et al., "Full privacy preserving electronic voting scheme", The Journal of China Universities of Posts and Telecommunications, vol. 19, No. 4, Aug. 2012, pp. 86-93.

Sheng et al., "Verifiable Privacy-Preserving Range Query in Two-Tiered Sensor Networks", The 27th Conference on Computer Communications. IEEE INFOCOM, Apr. 13-18, 2008, pp. 1-9.

Perera et al., "Context Aware Computing for the Internet of Things: A Survey" IEEE Communications Surveys & Tutorials, May 5, 2013, pp. 1-41.

Mishra et al., "A Privacy Preserving Repository for Securing Data Across the Cloud", 3rd International Conference on Electronics Computer Technology, Apr. 8-10, 2011, pp. 6-10.

Extended European Search Report received for corresponding European Patent Application No. 14884814.6, dated Sep. 5, 2017, 6 pages.

Kipnis et al., "Efficient Methods for Practical Fully-Homomorphic Symmetric-Key Encryption, Randomization, and Verification", International Association for Cryptologic Research, 2012, pp. 1-20.

Kumar, "Algorithm-Based Secure Outsourcing of Matrix Computations", Thesis, Oct. 26, 2013, 43 pages.

\* cited by examiner

METHOD AND APPARATUS FOR VERIFYING PROCESSED DATA

RELATED APPLICATION

This application was originally filed as PCT Application No. PCT/CN2014/073050 filed Mar. 7, 2014.

FIELD OF THE INVENTION

The present invention generally relates to verification of processed data. More specifically, the invention relates to verification of correctness of data processing and even the facticity of data collected in one or more networks.

BACKGROUND

Since the emergence of communication networks, various devices were invented and various existing devices, apparatuses, machines, objects and so on were merged into such communication networks for the ease of not only communications but also attractive applications for human-beings. Internet of Things (IoT) is an example of such tremendous expansion of networks. The term of IoT was proposed in 1990s and refers to uniquely identifiable objects and their virtual representations in an Internet-like structure. From then on, different definitions for IoT have appeared and the term of IoT is evolving as the technology and implementation of the ideas move forward.

Briefly speaking, IoT is going to create a world where physical objects are seamlessly integrated into information networks thus advanced and intelligent services can be provided for kinds of users. The interconnected "things", such as sensors or mobile devices or the like, sense, monitor and collect all kinds of data about human social life. The collected data can be processed for subsequent usages. For example, the data can be further split, aggregated, analyzed, computed or processed in any desired ways, to extract or obtain information to enable intelligent and ubiquitous services. In these days, IoT has evolved as an attractive next generation networking paradigm and service infrastructure. Various applications and services of IoT have emerged in various fields such as surveillance, health care, security, transportation, food safety, distant object monitor and control, etc. The future of IoT is promising.

Further, the wide expansion of IoT facilitates the evolving of another technology which is called cloud computing. Cloud computing offers a new way of service provision by re-arranging various resources for example such as storage, data computing and applications and by providing the ones as required by users, thus provides a large resource pool by linking network resources together. Upon cooperating with IoT, cloud computing can provide computing services to take over data processing loaded at personal terminals, hosts or even some service providers, wherein said data processing is generally big, heavy or complex for the parties maintaining the data, and thus are desired for relatively professional or dedicated processions by certain parties or apparatuses.

One practical scenario is that data monitored or sensed in the network, such as IoT, (from the "things" like mobile devices or the like) can be aggregated or collected, and sent to the cloud. A cloud service provider (CSP) of the cloud in turn processes received data and provides data computing results to requesting parties, such as an IoT service provider that may be offered by another CSP. In this case, the overall capability of data processions is enhanced and QoS is improved, which fueled even quicker expansions of network-related services. However, integrating difference parties together and arranging them to cooperate with each other will certainly raise an issue which cannot be neglected, i.e., the security.

The concept of Privacy Preserving Data Mining (PPDM) is proposed for supporting to provide various IoT services securely and intelligently in a pervasive and personalized way. In practice, this is still a challenge especially when considering computation complexity and communication cost.

Secure multi-party computation (SMC) is introduced into the scenario for secure computation among participants (who are not trusted with each other), particularly with the preference of privacy preserving computational geometry. In this case multiple parties participate in the computation with their own secret inputs, and wish to cooperatively compute a function. It is desired that each party can receive its own correct output and thus knows its own output only after finishing the cooperated computation, then privacy is preserved.

In order to deal with security-related considerations some of which are mentioned in the above, several schemes are proposed. For example, a new architecture was proposed to enable SMC by hiding the identity of the parties (by for example taking part in the process of Business Process Outsourcing). A class of functions was employed to enable a party to split its huge data before submitting it to CSP for computation. Upon such processions, the process data is almost intractable for other parties to know its actual source, thereby secure and privacy-preserved data collections are possible.

A privacy-preserving sequential pattern mining solution was designed based on secure multi-party sum protocol and secure multi-party multi-data ranking protocol for privacy-preserving consumptive action analysis of multi-marketplace, privacy-preserving disease diagnose of multi-hospital and so on.

Further, schemes for securely extracting knowledge from two or more parties' private data were also proposed. Upon study of privacy-preserving Add and Multiply Exchanging Technology, three different approaches to privacy-preserving Add to Multiply Protocol were designed, and further extension to privacy-preserving Adding to Scalar Product Protocol has been proposed. A private-preserving shared dot product protocol that is a main building block of various data mining algorithms with privacy concerns has been studied and fundamental security guarantee for many PPDM algorithms becomes possible. Wherein, a privacy-preserving two-party shared dot product protocol based on some basic cryptographic techniques, which is provably secure in a malicious model in the semi-honest model, is constructed. A HDPPDK-Means (Horizontal Distribution of the Privacy Protection DK-Means) algorithm based on Horizontal partitioned database and DK-means idea is proposed to realize distributed clustering, thus a secure multi-party computation protocol is applied to achieve the Privacy Preserving objective. Other examples such as statistical test, association rule mining, a generic formulation of secure gradient descent methods with privacy preservation, various encryption such as homomorphic encryption, are also utilized in various fields.

However, current researches in the field mainly focus on auditing cloud data storage and data integrity with regard to data operations, such as insertion, deletion, and addition, but none of them care about the security of the party processing cloud data, such as the correctness of data processing like calculation and computation (especially the correctness of encrypted collected data), the facticity of the data or the like. While in practice, the parties responsible for such heavily and important data storage or maintaining, computing, processions and so on, such as the above mentioned CSP, are possibly not fully trusted, for both the data source (for example the above IoT data provider) and/or the requesting party like the above another IoT service provider, or a user terminal, etc.

For example, CSP may acts as an untrustworthy party by malicious miming the raw data obtain from an IoT data provider, and provides such processed data to a third party, i.e., a party requested this CSP for the data collected from that IoT data provider. In this case, upon further services offered by the requesting party based on such wrong IoT data computing results, the service quality thereof can be degraded intentionally. From this we can see that how to ensure the facticity of data sources, the correctness of IoT data processing, computing, as well as mining, becomes a practically crucial issue that greatly impacts the overall user experience.

Unfortunately, the solutions the inventors know don't care about the potential risks at the CSP side.

The above background illustrates the environment of the invention and considerations of inventors. This part is mainly introduced under the related requirements by law and for ease understanding the original purpose of this invention. However, this does not mean that the information given in this part is admitted as prior art. In other words, it is not necessarily that the content above is part of prior art, it is quite possible that some or most of it is just known by the inventors rather than all those skilled in the art.

SUMMARY

Solutions for verifying processed data are proposed in this invention.

According to a first aspect of the present invention, there is provided a method comprising: obtaining, at a trustworthy party, a data processing result from a requesting party or a processing party in response to receiving a request for verifying correctness of the data processing result from the requesting party, wherein the data processing result is obtained by the requesting party from the processing party, obtaining, at the trustworthy party, the data used to getting the data processing result and a corresponding algorithm from the processing party, wherein the processing party uses the corresponding algorithm to process the data and gets the data processing result, processing, at the trustworthy party, the obtained data with the corresponding algorithm and comparing the processed result with the received data processing result, and if the two results are the same, the data processing result verified by the trustworthy party is correct.

According to an exemplary embodiment of the invention, the data and the data processing result are encrypted. In another exemplary embodiment of the invention, the data and the data processing result are signed. In another exemplary embodiment of the invention, the data processing result is context-related.

Still in another exemplary embodiment of the invention, the method further comprising a step of verifying the facticity of the data received from the processing party based on at least one of historical information, statistical information. Optionally, the historical information comprises historical data mining and/or data pattern learning.

In another exemplary embodiment of the invention, the method further comprising a step of checking whether the requesting party has a right to access to data maintained by the processing party.

In another exemplary embodiment of the invention, the processing party is a cloud service provider, and the data processed by the processing party is received from a data providing party within Internet of Things.

In another exemplary embodiment of the invention, the algorithm support homomorphic encryption.

According to a second aspect of the present invention, there is provided an apparatus comprising: at least one transceiver and at least one processor, wherein the processor is configured to cause the apparatus to perform: obtaining a data processing result from a requesting party or a processing party in response to receiving a request for verifying correctness of the data processing result from the requesting party, wherein the data processing result is obtained by the requesting party from the processing party, obtaining the data used to get the data processing result and a corresponding algorithm from the processing party, wherein the processing party uses the corresponding algorithm to process the data and gets the data processing result, processing the obtained data with the corresponding algorithm and comparing the processed result with the received data processing result, and if the two results are the same, the data processing result verified by the apparatus is correct.

According to a third aspect of the present invention, there is provided a method, comprising: processing, at a processing party, data received from a data providing party with a corresponding algorithm to get a data processing result, transmitting, at the processing party, the data processing result to a requesting party in response to receiving its request, transmitting, at the processing party, the data and the corresponding algorithm in responsive to a message requiring this from a trustworthy party, wherein the trustworthy party sends the message upon receiving a request for verifying correctness of the data processing result from the requesting party, wherein the trustworthy party will process the data with the corresponding algorithm obtained from the processing party and comparing the processed result with the received data processing result, and if the two results are the same, the data processing result verified by the trustworthy party is correct.

In an exemplary embodiment of the invention, the method further comprises a step of transmitting, at the processing party, the data processing result to the trustworthy party.

In an exemplary embodiment of the invention, the method further comprising a step of transmitting, at the processing party, a request for checking whether the requesting party has a right to access to data maintained by the processing party to the trustworthy party.

In an exemplary embodiment of the invention, the data received from a data providing party is encrypted, and the data processing result provided by the processing party to the requesting party is signed, and/or the data processing result is context-related.

According to a fourth aspect of the present invention, there is provided an apparatus comprising: at least one transceiver and at least one processor, wherein the processor is configured to cause the apparatus to perform: processing data received from a data providing party with a corresponding algorithm to get a data processing result, transmitting the data processing result to a requesting party in response to receiving its request, transmitting the data and the corresponding algorithm in responsive to a message requiring this from a trustworthy party, wherein the trustworthy party sends the message upon receiving a request for verifying correctness of the data processing result from the requesting party, wherein the trustworthy party will process the obtained data with the corresponding algorithm and comparing the processed result with the received data processing result, and if the two results are the same, the data processing result verified by the trustworthy party is correct.

According to a fifth aspect of the present invention, there is provided a method comprising: transmitting, at a requesting party, a request for a data processing result processed by a processing party to the processing party, wherein the processing party processed data received from a data providing party with a corresponding algorithm to get the data processing result, transmitting, at the requesting party, a request for verifying correctness of the data processing result received from the processing party to a trustworthy party, wherein the trustworthy party will obtain the data processing result from the requesting party or the processing party in response to receiving the request for verifying, obtain the data and the corresponding algorithm from the processing party, process the data with the corresponding algorithm and compare the processed result with the received data processing result, if the two results are the same, the data processing result verified by the trustworthy party is correct.

In an exemplary embodiment of the invention, the method further comprising a step of requesting the trustworthy party to verify the facticity of the data received from the processing party.

According to a sixth aspect of the present invention, there is provided an apparatus comprising: at least one transceiver and at least one processor, wherein the processor is configured to cause the apparatus to perform: transmitting a request for a data processing result processed by a processing party to the processing party, wherein the processing party processed data received from a data providing party with a corresponding algorithm to get the data processing result, transmitting a request for verifying correctness of the data processing result received from the processing party to a trustworthy party, wherein the trustworthy party will obtain the data processing result from the apparatus or the processing party in response to receiving the request for verifying, obtain the data and the corresponding algorithm from the processing party, process the data with the corresponding algorithm and compare the processed result with the received data processing result, if the two results are the same, the data processing result verified by the trustworthy party is correct.

According to a seventh aspect of the present invention, there is provided an apparatus comprising a processor and a memory, said memory containing instructions executable by said processor to perform steps according to any one of preceding methods.

According to an eighth aspect of the present invention, there is provided a computer program comprising codes for performing the steps of the method according to any one of the preceding methods.

According to a ninth aspect of the present invention, there is provided a computer readable storage medium bearing computer program codes for performing the steps of the method according to any one of the preceding methods.

According to a tenth aspect of the present invention, there is provided an apparatus comprising means for performing steps according to any one of the preceding methods.

The above exemplary embodiments of the invention can be combined in any appropriate manner, thus allow the implementations of the invention solve or at least improve security related characteristics regarding a processing party. In some specific embodiments, context-related property is supported, and in other embodiments, privacy is preserved by using encryption. In some other specific embodiments, even the facticity of data used by the processing party can be verified or evaluated. It is obvious that advantages obtained by applying the solutions of the invention are significant for skills in the art.

BRIEF DESCRIPTION OF THE DRAWINGS

The attached accompanying drawings illustrate exemplary embodiments of the invention, which are only for explaining the principle of the invention while not for limiting the invention from any aspect to those illustrated details both for network environments and operations or specific structure thereof. It should be noted that those drawings show merely elements relating to the invention while omit other components may be necessary for operating a network, a device or a method flow or the ones popularly used/deployed thereof, for the sake of illustrating the invention concisely and clearly, but this does not mean that those various embodiments of the invention exclude any of the above or any additional arrangements. Wherein.

DETAILED DESCRIPTION OF THE INVENTION

The embodiments of the present invention will be described in details with reference to the accompanying drawings hereinafter. Reference throughout this specification to features, advantages, or similar languages does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Figure 1:
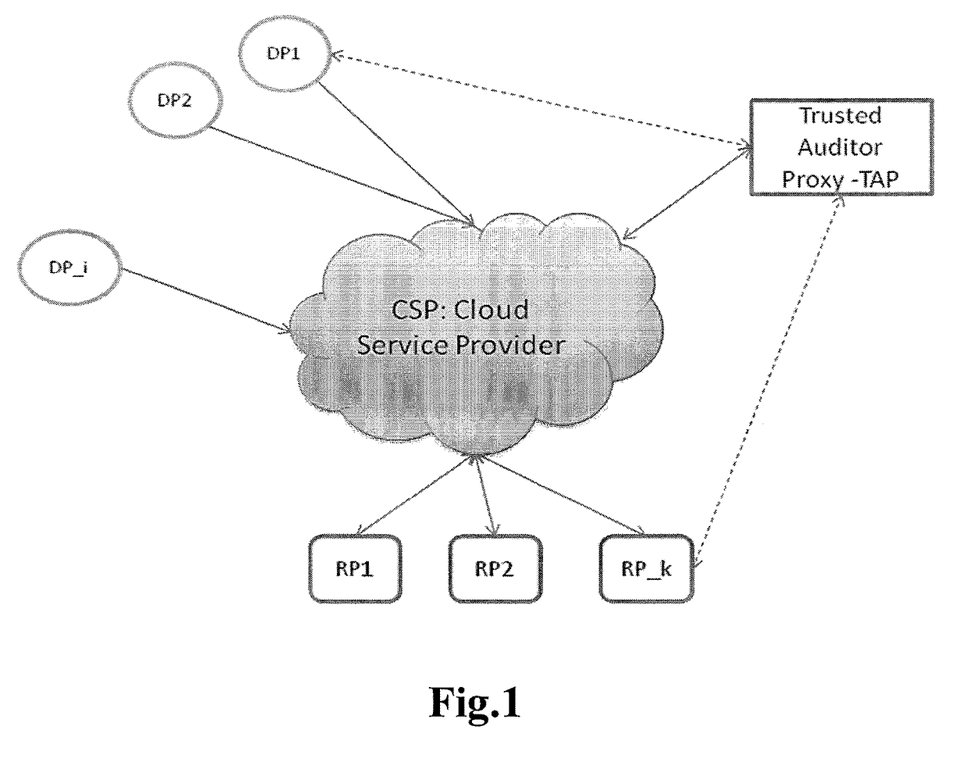
FIG. 1 is an illustrated diagram illustrating an exemplary network architecture in which various embodiments of the invention are applicable to be implemented.

FIG. 1 shows an exemplary network architecture of an IoT cloud computing scenario. FIG. 1 shows four kinds of entities, Data Provider (DP), Cloud Service Provider (CSP), Requesting Party (RP) and Trusted Auditor Proxy (TAP). Herein, FIG. 1 shows several DPs and RPs respectively. However, it is obvious that the numbers of all the above four entities are not limited to the ones shown thereof. In practice, it is quite possible that there is a plurality of TAPs, DPs or the like. Further, there can be various other network entities being located nearby, or even interacting with the ones shown in FIG. 1, or acts as forwarding nodes between such as CSP and RP.

DPs shown in FIG. 1 interact with the physical world, and detect, monitor or sense information of objects (in some cases are in different contexts). Then DPs can provide the collected data to CSP for further processing. Further, as stated in the background of the invention, considering privacy-preservation or other purposes, data collected by DPs can be encrypted before being sent to CSP.

CSP in turn has functions and capabilities which DPs do not have, and is semi-trusted or distrusted to process data provided by DPs for example from the aspect of RP. Thus it is possible that private data of physical objects that are collected by DP is threatened or even destroyed. In an exemplary embodiment or scenario, CSP can support context awareness. That means RP as shown in FIG. 1 can request or query data specific for certain context.

TAP is responsible for security-related tasks, such as issuing essential keys to DPs in the case that encryptions by DPs are desired for such as subsequent homomorphic computation at CSP, issuing access keys to eligible RPs, verifying the correctness of CSP data processions or the facticity and genuine of data sources, or even checking the eligibility of access right of RP to CSP data processing results and so on. In order to achieve the verifications conducted by TAP, here TAP is a trustworthy party. Thus a check about eligibility of RP, such as whether RP is an authenticated party, its identity, its right and eligibility or the like, can also be guaranteed by TAP.

RP is the party that needs to use the CSP data processing/computing results in order to offer intelligent and ubiquitous services to end users. In an exemplary embodiment, RP queries CSP data processing/computing results in different contexts. In that case, CSP supports context-based query or in other words, context awareness, then verification of the correctness of data processing and auditing the facticity of data collection in different contexts are possible. It can be easily understood that any entities can be RP in a specific scenario, for example another DP, CSP or the like. Here RP can only access the final data processing results of CSP, it has no rights to access to the intermediate results, or the raw data (the data collected by DPs and sent by DPs to RPs). Further, RP can also request TAP to verify the correctness of the received data processing result or even verify or audit the facticity of data collection.

Here in the invention, it is understood that different types of data, for example, user's location, calling information, radio connectivity quality at a certain location or at certain time, inbound/outbound data traffic, personal health related information (like heart beet rate, blood pressure, breathing volume/frequency and so on), etc., could be collected by various devices like personal mobile phones, smart watch, or wearable sensors/devices. Then the collected data is provided to CSP for further processing such as computing, thus the processing results based on the data collected by DP as shown in FIG. 1 can be used by different IoT services (which can be seen as a kind of RP as shown in FIG. 1) to offer a diversity of smart services. In addition, the algorithms used for computing or processing different types of data at CSP can be different and selected based on the characteristics of specific data and the demand of the RP party.

As mentioned in the above, in the scenario as shown in FIG. 1, considering CSP is not fully trusted and the privacy of monitored objects is sometimes desired to be preserved, the collected data by such as 'things' in the architecture of IoT, or any other applicable or appropriate devices in any communication networks or the like can be encrypted. In this case, it can be easily understood that various appropriate or applicable encryption can be used at the DP side. If encryption is utilized then data collections with privacy preservation (at least in a certain degree) is realized. If encryption is utilized, DP can request TAP for keys necessary to encryption and use them during the encryption.

The environment shown in FIG. 1 is only illustrative and not intended to suggest any limitation as to the scope of use or functionality of embodiments of the invention described herein. It could be understood that the architecture and the corresponding functionalities illustrated in conjunction with FIG. 1 may be implemented by adding, deleting or replacing some parts thereof.

Now interactions among those related parties in the network architecture as shown in FIG. 1 according to one embodiment of the invention will be explained in conjunction with FIG. 2 in the following. Herein, the process shown in FIG. 2 is a very specific scenario in which context awareness is supported, encryption at DP, authentication of RP by TAP, and both the correctness and the facticity verification are requested by RP.

Figure 2:
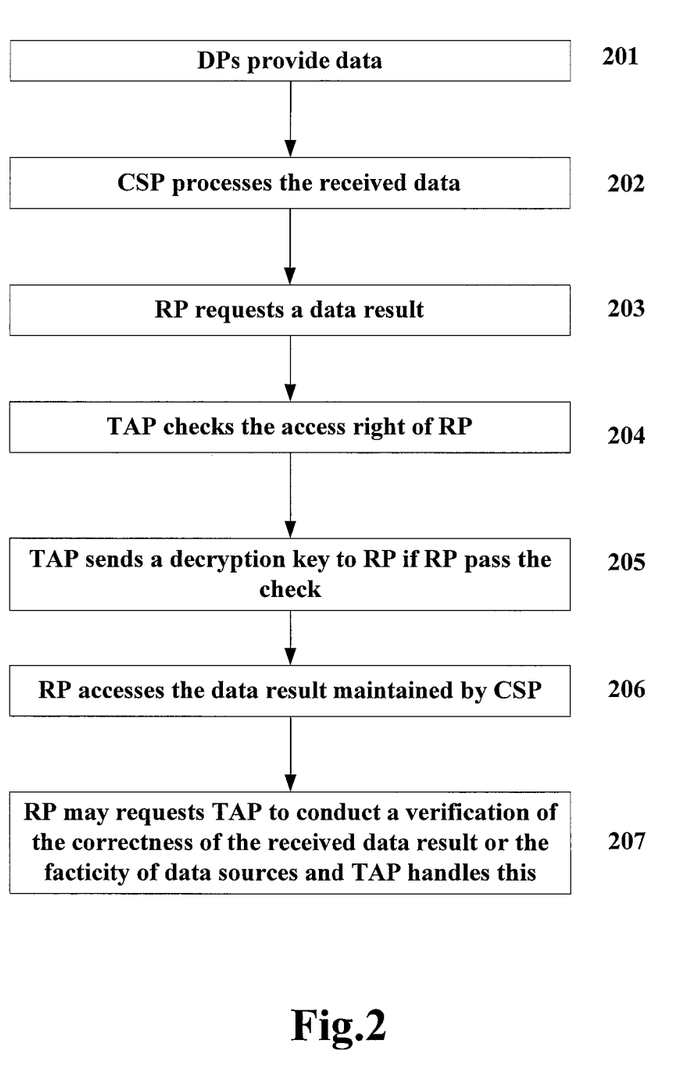
FIG. 2 is a process illustrating interactions among related parties in the network architecture as shown in FIG. 1 according to one embodiment of the invention.

As shown in block 201 of FIG. 2, DPs provide IoT data sensed in different contexts to CSP. Here DP can be seen as a 'thing' in IoT, it encrypts its sensed data with a key offered by TAP and signs it (context ID is also indicated if context awareness is supported thereof). Then DP transmits the encrypted data, context ID and the corresponding signature to CSP which will be used as an input of multi-party computation at CSP side.

In block 202 of FIG. 2, CSP processes the received data. For example, CSP computes the data in different contexts from some or all DPs (which may be data providers and are data sources) by applying different algorithms and signs the computation result. Wherein those algorithms used by CSP can be specific to the related context, and CSP can identify or pick out or select appropriate algorithm according to corresponding context identification.

In block 203 of FIG. 2, if RP requests CSP for a data processing result which is processed by CSP. If CSP supports context awareness (i.e., CSP can identify data processing results in different contexts), RP can request for a data processing result with regard to a particular or specific context. In this case, for security consideration or in the case of paid service provided by CSP, CSP can request TAP for checking the identity of RP, such as authentication. Obviously, such eligibility check is optional, for example if such service is free for any users and the privacy-preserving level is relatively low.

In block 204 of FIG. 2, TAP checks the access right of RP upon CSP's request. Then if the result is positive, i.e., RP passes this check, TAP sends a decryption key to RP (which can be obtained by means of RP's privacy key) in block 205. Here If the check is negative, TAP can inform CSP to reject the request from RP, or simply neglects this (in which case if CSP does not receive any feedback from TAP within certain time period, or RP cannot receive corresponding necessary information for accessing the data processing result, CSP will reject RP or RP fails to make any access to CSP). Of course, if there is no security related consideration at DP and thus DP just sends the collected data to CSP without encryption, this step can be omitted. Similarly, if DP conducts other processing on its collected data, here at this step, TAP can accordingly provide the information necessary for RP to make de-processing performed by DP to RP. Here the de-processing means any processing necessary for RP to perform in a reverse direction as compared with the processing conducted by DP, in order to use the received data result.

In block 206 of FIG. 2, upon receiving the decryption key from TAP, RP can access the requested data processing result. Again it is obvious that this step can be performed before step 205. For example, instead of sending a decryption key to RP directly, TAP may response CSP with a message indicating that the RP has an access right. Then CSP responds RP with the requested data processing result, then sequentially or simultaneously TAP may provide a necessary decryption key to RP. It is also possible that TAP provides a decryption key upon the RP's request. Anyway, it can be understood that any applicable process with or without certain sequence can be arranged appropriately.

In block 207 of FIG. 2, in the case that RP wants to check the correctness of the data processing result obtained from CSP, or if it wants to know the facticity of the data used for CSP making such data processing result, it may requests TAP to conduct a verification. In such a scenario, RP may provide related information to TAP and TAP handles RP's request and feedback latter.

From above we can see an exemplary process (with context awareness and privacy preservation) among DP, CSP, RP and TAP. It is also obvious that some of the above steps or operations or part operations in a single block are not necessary or are optional, such as step 204, 205, verification of correctness or the facticity in step 207, and some of them can be arranged differently, such as splitting, combination, inversing or the like.

Figure 3:
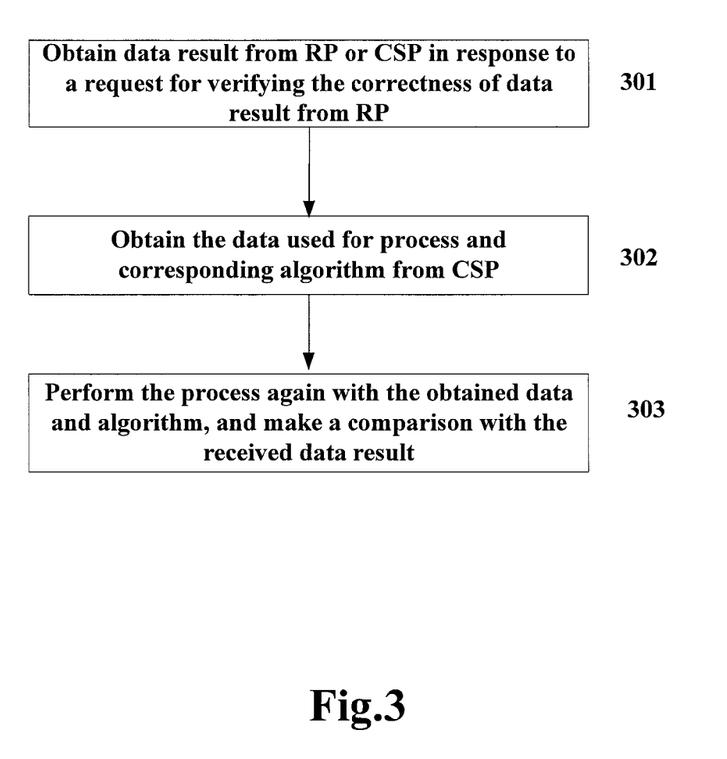
FIG. 3 is a process illustrating operations at a Trusted Auditor Proxy (TAP) as shown in FIG. 1 according to one embodiment of the invention.
Figure 4:
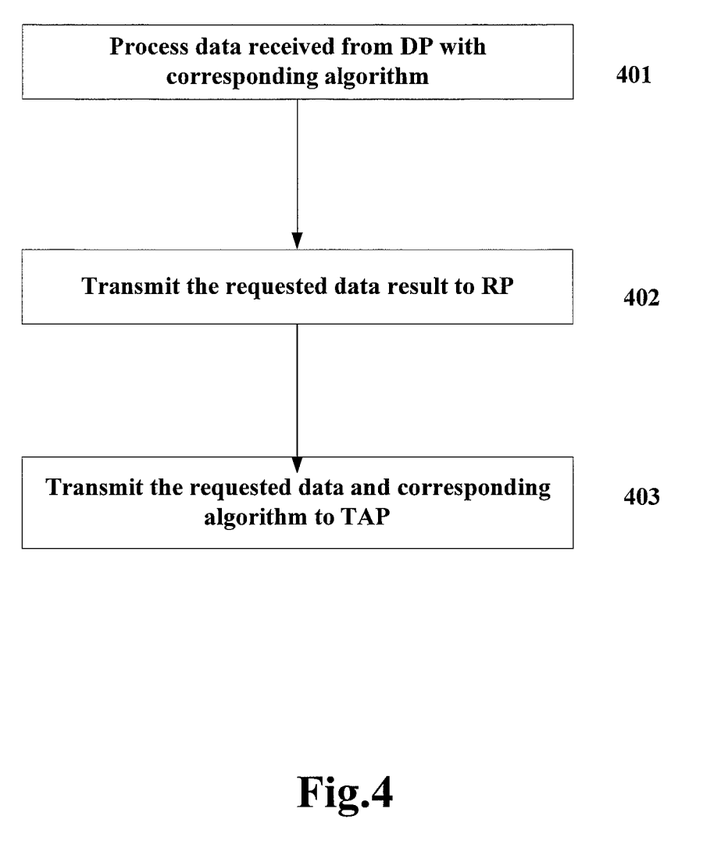
FIG. 4 is a process illustrating operations at the CSP as shown in FIG. 1 according to one embodiment of the invention.
Figure 5:
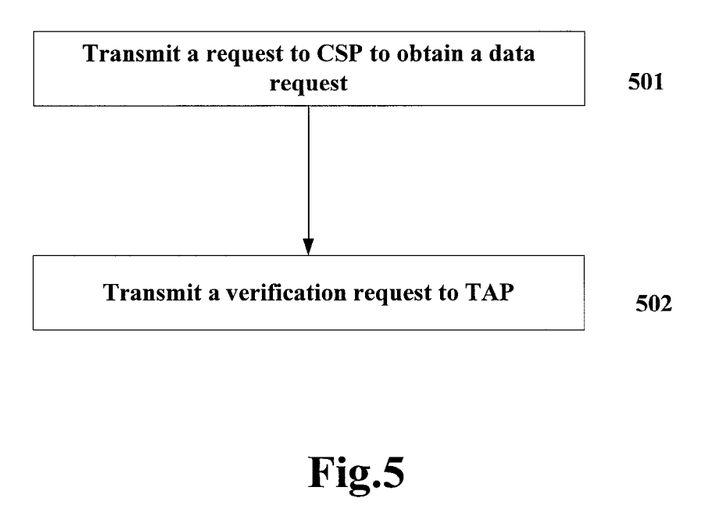
FIG. 5 is a process illustrating operations at the RP as shown in FIG. 1 according to one embodiment of the invention.

In the followings, FIGS. 3-5 show operations at TAP, CSP and RP side respectively in the environment as shown in FIG. 1 according to illustrated embodiments of the invention.

As shown in FIG. 3, at block 301, TAP obtains a data processing result from a RP or CSP, in response to receiving a request for verifying correctness of the data processing result from the RP. Here the data processing result is obtained by RP from CSP. At block 302, TAP further obtains the raw data received by CSP from DP and a corresponding algorithm from CSP. Here the corresponding algorithm is used by CSP to process the received data and get the data processing result. At step 303, TAP processes the obtained data with the corresponding algorithm again, and compares the processed result with the received data processing result. Then if the two results are the same, the data processing result is correct.

It can be understood that if TAP receives the data processing result from RP, it verifies the result received by RP, while if TAP receives the data processing result from CSP, it verifies the result obtained by CSP. The difference between the two scenarios is that, if for example CSP is untrustworthy, then the result received by RP may different from the ones actually obtained by CSP at its side. Thus allow TAP to verify the result received by RP or get/obtained by CSP or both, depends on the specific arrangements in different network environments.

In other exemplary embodiments, encryption and signature can be utilized, and in other scenarios, data specific to context can also be used thereof. In such case, RP can transmit the obtained data processing result with signature signed by CSP (optionally with the corresponding hash code) to TAP. Then TAP may query CSP to get the encrypted data (to which a corresponding algorithm is applied to obtain the data processing result provided to RP), in order to verify the processing correctness of CSP. Optionally, DP signs its collected data in a context (e.g., in a batch way), which can allow TAP to find the malicious DP when auditing or verifying the facticity of data, for example by finding malicious data input by means of analysis and mining. In this case, TAP can mine the collected data received and further used at CSP, and analyze if the data source has some abnormal behaviors according to for example historical patterns comparison.

In another exemplary embodiment of the invention, as mentioned in the above, TAP can check if RP has the right to access to data maintained by CSP.

As shown in FIG. 4, at block 401, as mentioned in the above, CSP processes data received from DP with a corresponding algorithm thereby to get a data processing result. Herein, if CSP or the whole system supports context-related queries by RP, the algorithm used thereof may be different from context to context. In addition, it can be easily understood that any desired and possible processions can be deployed at CSP. At block of 402, CSP transmits the data processing result as required by RP in response to receiving a request from RP. Optionally, under the scenario of context-related environment, such request can indicate specific context identification. As block of 403, CSP transmits the data and a corresponding algorithm in responsive to a message from TAP (under a request for verification from RP). Then upon the information provided by CSP, TAP can conduct the verification. In an exemplary embodiment of the invention, the data processing result to be verified by TAP may be obtained from CSP rather than RP.

In an exemplary embodiment of the invention that has already illustrated in the above, CSP can also request TAP to check the eligibility of RP before or after providing the data processing result requested by RP.

As shown in FIG. 5, at the block of 501, RP transmits a request for a data processing result to CSP, wherein CSP processes data received from DP with a corresponding algorithm to get the data processing result. At the block of 502, RP transmits a request for verifying correctness of the data processing result received from CSP to TAP. Then TAP conducts the above mentioned verification. In an exemplary embodiment of the invention, RP can also request TAP to verify the facticity of the data.

The various blocks shown in FIGS. 2-5 may be viewed as method steps, and/or as operations that result from operations of computer program code, and/or as a plurality of coupled logic circuit elements constructed to carry out the associated function(s). The schematic diagrams described above are generally set forth as logical flow chart diagrams. As such, the depicted order and labeled blocks are merely indicative of specific embodiments of the presented methods. Other steps and methods or operations may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
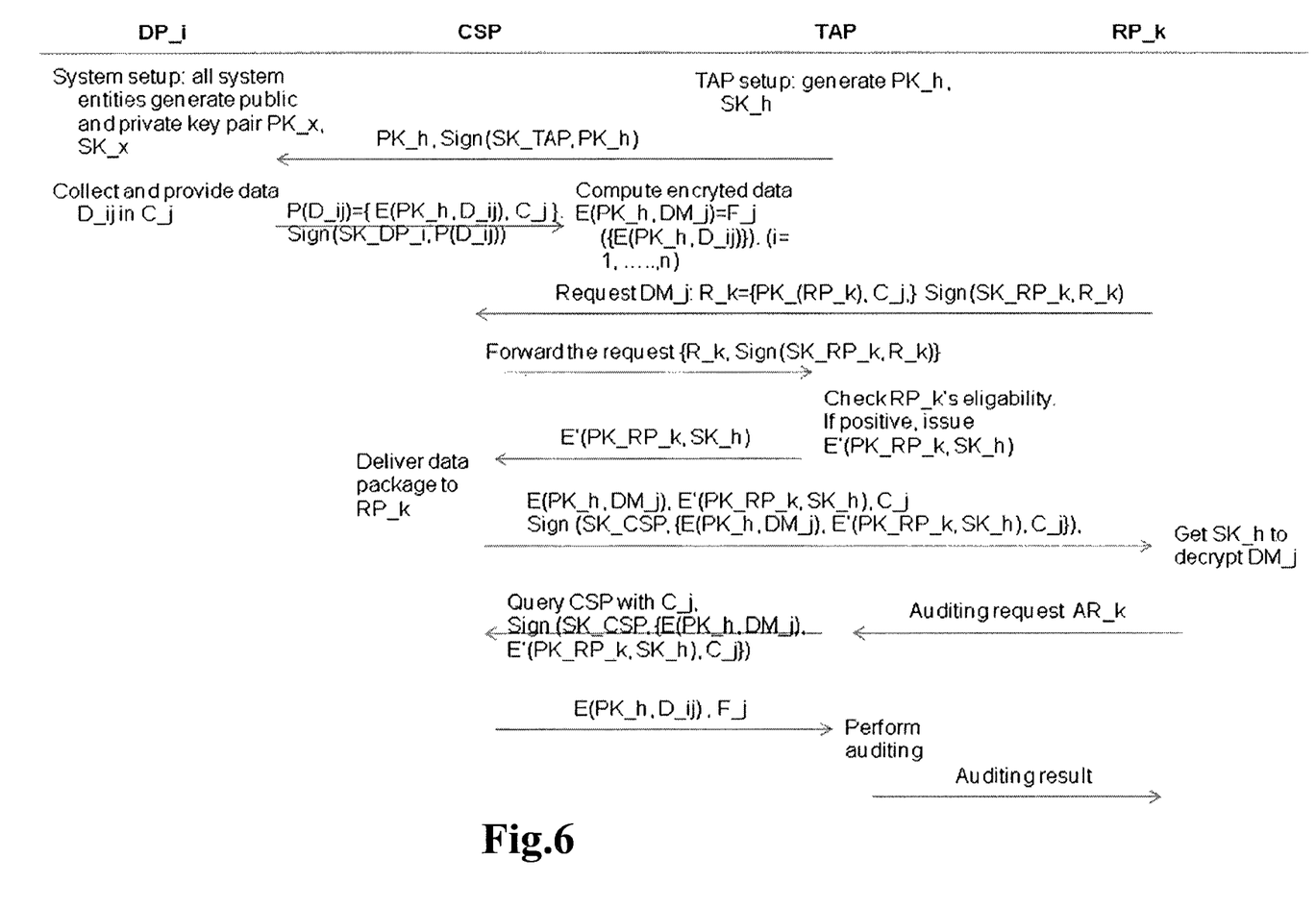
FIG. 6 shows an exemplary message flow among related parties in the network architecture as shown in FIG. 1 in accordance with one embodiment of the invention.

FIG. 6 shows an exemplary message flow among related parties in the network architecture as shown in FIG. 1 in accordance with one embodiment of the invention. Therefore, specific parameters have been utilized to illustrate information comprised within a message, or operations done by relative entities. However, it should be noted that all these charts are exemplary ones and merely for ease of the understanding of the invention, thus it should not be seen as any limitations on the invention.

In the following, we assume the algorithms used at CSP support fully homomorphic encryption. That is, the result after using the algorithms thereof is encrypted with the same encryption method of those encrypted data provided by DP and input into this computing result conducted by CSP. Thus the encrypted result can be decrypted with corresponding decryption key by RP.

For ease of understanding, Table 1 below summarizes some parameters used for exemplarily illustrating the procedures of system setup and messages thereof.

TABLE 1

Parameters Description

| Parameters | Description | Usage |
|---|---|---|
| PK_h | The public key for homomophic encryption | This key may be changed dynamically, and a plurality of such keys can be used in the system. |
| SK_h | The private key for homomorphic decryption | For homomorphic decryption |
| PK_x | The public key of entity x | the entity can be DP, RP, CSP or TAP |
| SK_x | The secret key of entity x | |
| DP_i | The ith data provider | |
| RP_k | The kth requesting party | |
| C_j | The jth context | |
| D_ij | The data provided by DP_i in contex of C_j | |
| E(PK_h, D_ij) | The homomophic encryption of D_ij | |
| F_j | The data computing function/algorithm with regard to C_j at CSP | |
| E'(PK_x, SK_h) | An encryption function using the encryption key PK_x to encrypt SK_h | |
| Sign(SK_x, Data) | Signature of Data signed by SK_x | |
| H( ) | A one-way hash function | |
| DM_j | Processing or computing result on collected data in context j at CSP | |

For system setting up, each system entity x generates its own public and private key pairs: PK_x and SK_x as shown in FIG. 6, if necessary. Similarly, TAP generates PK_h and SK_h, and issues the homomophic key PK_h to each DP_i (i=1, ... , I). Here TAP further signs its generated PK_h with SK_TAP. Note that the keys utilized here can be dynamically changed or different from context to context. Further, there can be a plurality of PK_h keys in the system. Herein, for simplification, FIG. 6 only shows PK_h to denote the homomophic encryption key and SK_h to denote the homomophic decryption key. Of course, each system entity can announce its public key PK_x to other system entities.

As mentioned in the above, DP collects data. Then for DP_i to provide data D_ij collected in context C_j to CSP, in order to preserve the privacy of the monitored objects, DP_i encrypts D_ij using the homomophic key PK_h issued by TAP, E(PK_h, D_ij) (which is also denoted as P(D_ij)). Meanwhile, DP_i signs the data to be sent, i.e., P(D_ij), then obtained Sign(SK_DP_i, P(D_ij)). Thereby the hash code of data package P(D_ij) (i.e., H(P(D-ij))) (wherein P(D_ij)={E(PK_h, D_ij), C_j} is signed. DP_i then sends the P(D_ij), Sign(SK_DP_i, H(P(D_ij))) to CSP.

CSP in turn conducts data processing and computations, it selects corresponding homomophic algorithm F_j based on C_j, to process received encrypted data E(PK_h, D_ij) in the context C_j from DP_i, thereby obtain encrypted data processing result E(PK_h, DM_j), that is: E(PK_h, DM_j)=F_j ({E(PK_h, D_ij)}). (i=1, ... , n). Herein, DM_j denotes the processing/computing result on collected data in context j (i.e., D_j) at CSP.

Then when necessary, RP_k requests CSP for the data processing and computing results in C_j, with the requesting message that contains C_j and PK_(RP_k).

Upon receiving the request, CSP forwards the request to TAP for checking the access right of RP_k.

Then corresponding TAP conducts this check. If RP_k passes current access policy, i.e., the check result is positive, TAP issues an encrypted SK_h, i.e., E'(PK_RP_k, SK_h) with RP_k's public key based on a public key encryption scheme. TAP transmits E'(PK_RP_k, SK_h) to RP directly or to CSP. In the latter case, CSP further delivers the received data package, i.e., E'(PK_RP_k, SK_h), to RP_k.

Upon a positive check of the access right of RP_k, CSP transmits data package comprising E(PK_h, DM_j), Sign (SK_CSP, H(E(PK_h, DM_j))), and optionally E'(PK_RP_k, SK_h) and C_j or any appropriate combinations thereof to RP_k. Note that TAP can issue E'(PK_RP_k, SK_h) to RP_k directly if a positive check result is achieved in this step.

After receiving the package, RP_k can decrypt the E'(PK_RP_k, SK_h) with its SK_RP_k to get SK_h, which is further used to get the plain text of DM_j.

According to the embodiments described above, RP may not trust the processing result of CSP. In this case, it requests TAP to verify the correctness of its received data processing result (such as computations, mining, statistical analysis, pattern recognition, useful information extraction, etc.) by providing necessary information, such as the $C\_j$, the hash code of $DM\_j$ (i.e., $H(DM\_j)$), the signature provided by CSP, i.e., $Sign(SK\_CSP, H\{E(PK\_h, DM\_j), E'(PK\_RP\_k, SK\_h), C\_j\})$. In an exemplary embodiment of the invention, the request can be signed by RP to ensure non-repudiation. Thereby the request $AR\_k$ sent by $RP\_k$ contains $\{C\_j, H(DM\_j), Sign(SK\_CSP, H\{E(PK\_h, DM\_j), E'(PK\_RP\_k, SK\_h), C\_j\}), Sign(SK\_RP\_k, \{C\_j, H(DM\_j), Sign(SK\_CSP, H\{E(PK\_h, DM\_j), E'(PK\_RP\_k, SK\_h)\})\}$.

In this case, TAP conducts such verification by querying CSP to get $F\_j$ and all $E(PK\_h, D\_ij)$ used for generating $E(PK\_h, DM\_j)$. TAP decrypts $E(PK\_h, D\_ij)$ to get all $D\_ij$ and input them into $F\_j$ to get plain $DM\_j$, that is $DM\_j=F\_j(\{D\_ij\})$ ($i=1 \ldots, n$). TAP further compares the hash code of $DM\_j$ output from $F\_j$ and the one provided by the RP in order to judge if the computation and processing at CSP is correct.

According to one exemplary embodiment of the invention, TAP can investigate the facticity and genuine of data sources (DPs). It gets $Sign(SK\_DP\_i, P(D\_ij))$ from CSP, study the abnormality of data collection based on such as historical data mining and pattern learning.

The above illustrated an embodiment in which both the encryptions and context query are supported. However, it is obvious that this is merely a specific example in details. Relatively schematic or generalize operations have already shown in FIGS. 2-5. Therefore, any messages, parameters shown or illustrated here in FIG. 6 should not be seen as any limitations to the invention.

The above illustrated various embodiments of the invention. Upon the implementations of the invention, verifications of the correctness of certain parties, such as a cloud server is achieved at a trustworthy party. Thereby dishonest CSP or the ones behave maliciously during various data collection, processing or even data providing can be identified. In certain scenarios, privacy preservation is supported. In this case, data mining/processing/computing privacy is ensured. For example, both the party conducting data processing and the requesting party have no way to get the plain data collected by data sources in the network. Optionally, the facticity of data provided by data sources can also be verified by the trustworthy party. Optionally, only eligible RPs can access the result of data processing from CSP. Optionally, the invention supports query of data in different contexts by applying different algorithms accordingly.

In the above, various operations conceived by the inventors such as verification on the correctness of processing at a semi-trusted or distrusted party, further operations with context awareness support, and verification on the facticity of data collection, have been illustrated in the environment of cloud computing and IoT. However, it should be noted that the invention is not limited to such a specific environment. Upon some adjustments or amendments, the solutions of the invention can be used in any applicable types of existing network architectures or the ones appeared latter, so long as the not departing from the basic spirits of the invention. For example, some specific applicable fields of the invention can be but not limited to such as distributed electronic contract management, smart meter based load management, healthcare frauds and abuses, policy-agile encrypted networking for defense, law enforcement, intelligence community, commercial networks, privacy preserving path inclusion, privacy preserving string matching, privacy-enhanced recommender system in a social trust network, user profile matching in social networking, credit check applications, private collaborative forecasting and benchmarking, privacy-preserving genomic computations, protection against insider threats (e.g., business partners), privacy preserving electronic voting, and so on.

Figure 7:
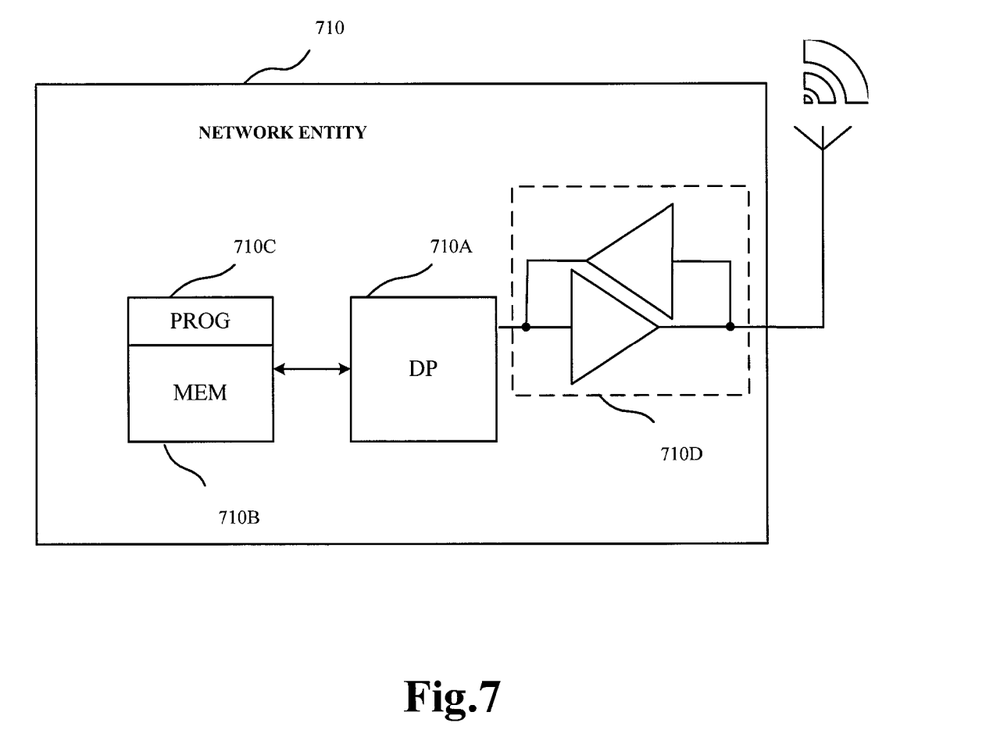
FIG. 7 is a simplified block diagram of various apparatuses which are suitable for practicing exemplary embodiments of the present invention.

FIG. 7 is a simplified block diagram of various apparatuses which are suitable for use in practicing exemplary embodiments of the present invention. In FIG. 7, the apparatus suitable for implementing various embodiments of the invention may comprise at least one processor (such as a data processor (DP) 710A shown in FIG. 7, and at least one memory (such as a memory (MEM) 710B comprising computer program code (such as a program (PROG) 710C. The at least one memory and the computer program code may be configured to, with the at least one processor, cause the network entity 710 to perform any of operations and/or functions described in combination with FIGS. 1-6. Alternatively or additionally, the network entity 710 may comprise various means and/or components for implementing functions of the foregoing steps and methods in FIGS. 1-6.

In an exemplary embodiment of the invention, PROG 710C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 710A of the network entity 710, or by hardware, or by a combination of software and hardware.

The MEM 710B may be of any type suitable to the local technical environment and may be implemented using any suitable data storage technology, such as semiconductor based memory devices, flash memory, magnetic memory devices and systems, optical memory devices and systems, fixed memory and removable memory. The DP 710A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be realized by one of skills in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skills in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

As for claims introduce hereinafter, operations, functions or steps thereof may not be performed or conducted in the order thereof. The sequence introducing those operations, functions or steps not mean a certain sequential implementations thereof. Those skilled in the art can understand that any applicable changes, amendments or adjustments can be made to the solutions recited thereof. In addition, a, an, the not denote any quantity utilized or employed in the solutions of the claims.

What is claimed is:

1. A method, comprising:
   receiving, via a communication network, at a network entity that is a trustworthy party, a request for verifying correctness of a data processing result from another network entity that is a requesting party, wherein the data processing result is encrypted using homomorphic encryption,
   receiving, via the communication network, at the network entity that is a trustworthy party, the encrypted data processing result from the requesting party or a cloud service provider that is a processing party, in response to the request for verifying correctness of the encrypted data processing result, wherein the data processing result is obtained by the requesting party from the cloud service provider,
   receiving, via the communication network, at the trustworthy party, data used to get the data processing result, wherein the data is encrypted using homomorphic encryption, and a corresponding algorithm from the cloud service provider, wherein the cloud service provider uses the corresponding algorithm to process the encrypted data and gets the encrypted data processing result, and the corresponding algorithm supports homomorphic encryption,
   processing, at the trustworthy party, the obtained, encrypted data with the corresponding algorithm that supports homomorphic encryption and comparing the processed result with the received, encrypted data processing result, and
   if the processed result and the received, encrypted data processing result are the same, the data processing result verified by the trustworthy party is correct.

2. The method according to claim 1, wherein the data and the data processing result are signed, and/or the data processing result is context-related.

3. The method according to claim 1, wherein the method further comprising:
   verifying facticity of the data received from the processing party based on at least one of historical information and statistical information.

4. The method according to claim 3, wherein the historical information comprises historical data mining and/or data pattern learning.

5. The method according to claim 1, wherein the method further comprising:
   checking whether the requesting party has a right to access to data maintained by the processing party.

6. The method according to claim 1, wherein the data processed by the processing party is received from at least one data providing party within Internet of Things.

7. An apparatus, comprising:
   at least one transceiver and at least one processor, wherein the processor is configured to cause the apparatus to perform:
   receiving, via a communication network, a request for verifying correctness of a data processing result from a network entity that is a requesting party, wherein the data processing result is encrypted using homomorphic encryption,
   receiving, via the communication network, the encrypted data processing result from the network entity that is the requesting party or a cloud service provider, distinct from the requesting party, which is a processing party, in response to the request for verifying correctness of the encrypted data processing result, wherein the data processing result is obtained by the requesting party from the cloud service provider,
   receiving, via the communication network, data used to get the data processing result, wherein the data is encrypted using homomorphic encryption, and a corresponding algorithm from the cloud service provider, wherein the cloud service provider uses the corresponding algorithm to process the encrypted data and gets the encrypted data processing result, and the corresponding algorithm supports homomorphic encryption,
   processing the obtained encrypted data with the corresponding algorithm that supports homomorphic encryption and comparing the processed result with the received encrypted data processing result, and
   if the processed result and the received encrypted data processing result are the same, the data processing result verified by the apparatus is correct.

8. The apparatus according to claim 7, wherein the data and the data processing result are signed, and/or the data processing result is context-related.

9. The apparatus according to claim 7, wherein the processor is configured to cause the apparatus further to perform:
   verifying facticity of the data received from the processing party based on at least one of historical information, statistical information.

10. The apparatus according to claim 9, wherein the historical information comprises historical data mining and/or data pattern learning.

11. The apparatus according to claim 7, wherein the processor is configured to cause the apparatus further to perform:
   checking whether the requesting party has a right to access to data maintained by the processing party.

12. The apparatus according to claim 7, wherein the data processed by the processing party is received from at least one data providing party within Internet of Things.

13. An apparatus, comprising:
   at least one transceiver and at least one processor, wherein the processor is configured to cause the apparatus to perform:
   processing data received via a communication network from at least one network entity that is a data providing party, with a corresponding algorithm that supports homomorphic encryption to get a data processing result, transmitting, via the communication network, the data processing result to another network entity that is a requesting party, in response to receiving its request, transmitting, via the communication network, the data and the corresponding algorithm in responsive to a message requiring the data and the corresponding algorithm from a further network entity that is a trustworthy party, wherein the trustworthy party sends the message upon receiving a request for verifying correctness of the data processing result from the requesting party, wherein the trustworthy party will process the obtained data with the corresponding algorithm and compare the processed result with the received data processing result, and if the processed result and the received data processing result are the same, the data processing result verified by the trustworthy party is correct and wherein the apparatus is a cloud service provider.

14. The apparatus according to claim 13, wherein the processor is configured to cause the apparatus further to perform:

transmitting the data processing result to the trustworthy party.

15. The apparatus according to claim 13, wherein the processor is configured to cause the apparatus further to perform:

transmitting a request for checking whether the requesting party has a right to access to data maintained by the apparatus to the trustworthy party.

16. The apparatus according to claim 13, wherein the data received from a data providing party is encrypted using homomorphic encryption, and the data processing result provided by the apparatus to the requesting party is signed, and/or the data processing result is context-related.

17. The apparatus according to claim 13, wherein the data processed by the apparatus is received from at least one data providing party within Internet of Things.

\* \* \* \* \*